W. H. MILLIKIN.
Whip.
No. 9,741. Reissued June 7, 1881.
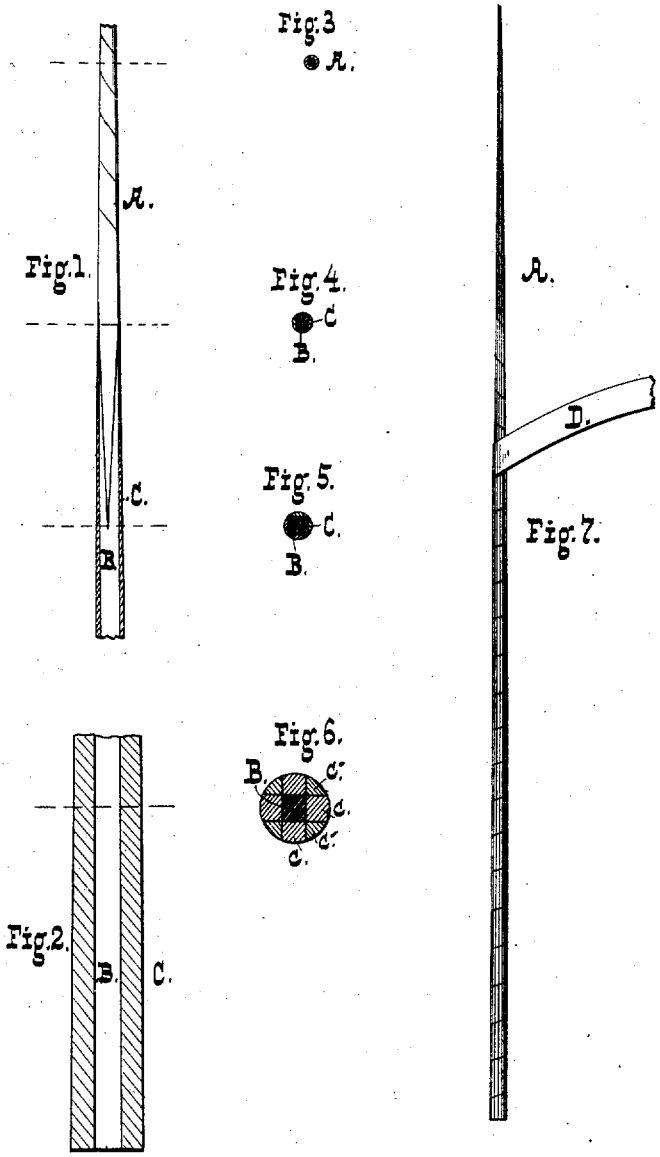
WITNESSES.
W. A. Bertram
De L. H. Barclay.
INVENTOR
Wm. H. Millikin.
BY
R. D. Williams
ATTORNEY.
N. PETERS, Photo-Lithographer, Washington, D. C.

UNITED STATES PATENT OFFICE.

WILLIAM H. MILLIKIN, OF BALTIMORE, MARYLAND.

WHIP.

SPECIFICATION forming part of Reissued Letters Patent No. 9,741, dated June 7, 1881.

Original No. 192,447, dated June 26, 1877. Application for reissue filed April 13, 1881.

*To all whom it may concern:*

Be it known that I, WILLIAM H. MILLIKIN, of Baltimore city, State of Maryland, have invented certain new and useful Improvements in Whips; and I hereby declare the same to be fully, clearly, and exactly described as follows, reference being had to the accompanying drawings, in which—

Figure 1 is a view of the jointed portion of the whip-body with the stocking in longitudinal section. Fig. 2 is a similar view of the butt portion of the whip-body. Figs. 3, 4, 5, and 6 are cross-sections taken upon the lines opposite in Figs. 1 and 2. Fig. 7 is a view of the whip-body, showing the application of the oiled fabric wound in reverse direction from the twist of the rawhide.

My invention consists, first, in a whip having a rattan stock and rawhide tip, spliced together and covered by textile fabric and webbing; and, second, in the peculiar construction of the device, as hereinafter set forth.

In the drawings, A represents the rawhide tip, and B the rattan core or wedge, which are united at a point near the middle of the whip, but slightly nearer the tip than the butt. The rattan core or wedge is made square, and has at its jointed end a central tapering wedge-shaped opening, such as is employed in joining the said core to whalebone tips as ordinarily practiced. The tip is the regular solid rawhide, of suitable length, squared at its butt or larger end, as shown at Fig. 4, and terminating in a tapering wedge, which corresponds to and exactly fits the wedge-shaped opening in the rattan core, into which opening it is inserted and securely retained by gluing.

The next step in the construction of the whip is the stocking of the same, which consists in applying to the flat sides of the rawhide and rattan strips C C′ for the sides and corners, which are made of rattan, and extend past the splice of the rawhide to strengthen the joint. This stocking, as thus applied, is glued in place, and then turned down to a round and smooth tapering body for the whip. About the whip-body, as thus formed, is then wrapped oiled muslin or silk strips D, the wrapping being in the reverse direction from the twist of the rawhide. This wrapping may extend throughout the entire length of the whip, or it may be confined to the tip and middle portions only, if desired.

The advantage of the rawhide tip over the whalebone tip as commonly used is due to the fact that it does not split and fray out, as does whalebone, and hence it forms a more durable whip. It does not, moreover, get permanently bent to one side, as does whalebone, and in uniting the tip to the rattan core the natural viscid gluey character of the rawhide permits a much more secure joint in gluing than does the dry and porous whalebone. The wrapping of the oiled silk or muslin also forms a protective binder for the entire whip, and, being wrapped in the reverse direction from the twist of the rawhide, the latter is not liable to become untwisted.

After the whip-body has been formed in accordance with my invention it is covered with the usual webbing or outside cover, the handle is loaded and finished, and a suitable cracker is attached to the tip.

Having thus described my invention, what I claim is—

1. A whip having a rawhide tip spliced to a rattan stock, and provided with an inner cover of textile fabric and an outer cover of webbing.

2. A whip having a rawhide tip and a rattan stock, and provided, also, with a wrapping of fabric in strips wound about the whip-body in the reverse direction from the twist of the rawhide, substantially as described, and for the purpose set forth.

WM. H. MILLIKIN.

Witnesses:
R. D. WILLIAMS,
W. S. WILKINSON.